March 5, 1940.  J. S. WESTFIELD  2,192,782

POSITIVE DISPLACEMENT OILER FOR INTERNAL COMBUSTION ENGINES

Filed Feb. 12, 1938

Inventor
Jack S. Westfield,
By Parker Cook
Attorney

Patented Mar. 5, 1940

2,192,782

UNITED STATES PATENT OFFICE 2,192,782

POSITIVE DISPLACEMENT OILER FOR INTERNAL COMBUSTION ENGINES

Jack Sharon Westfield, Kingston, Pa.

Application February 12, 1938, Serial No. 190,284

15 Claims. (Cl. 184—6)

My invention relates to new and useful improvements in an oiling mechanism for internal combustion engines, and has for an object to provide means for forcing the oil under pressure from the crank case into the crank pins, main bearings, and up into the wrist pin bearings of the connecting rods as well as forcing some of the oil internally of the pistons to thereby lubricate the cylinder walls of the engine.

Another object of the invention is to provide a positive displacement oiler, that is, rather than using a splash system to lubricate the several parts mentioned or rather than using a pump with rotating parts, there is provided what I term a displacement member, which is secured to the lower end of the connecting rod, which, during a portion of its revolution, places the oil under pressure in a trough or pocket, so that the oil under high pressure is forced through the displacement member to the crank pins and also through the crank shaft to the main bearings, and, furthermore, is driven up through tubes extending to the wrist pin bearings, so that they will be well lubricated.

Still another object of the invention is to provide a positive displacement oiler that will not only furnish oil for the movable parts, as abovementioned, but may also be used to further force the oil to the oil filter, timing gears, and other parts.

Still another object of the invention is to provide a simple and novel arrangement wherein oil in the crank case will be forced under high pressure to the crank pins, wrist pins, and cylinder walls, due to the movement of the connecting rod and its displacement member as the displacement member moves through an oil pocket or trough in the crank case.

Still another object of the invention is to provide a positive displacement oiler wherein certain types of bearings are used at the lower end of the connecting rod so that the oil may be forced at certain intervals or periods up to the wrist pins and at certain intervals will be forced into the crank pins and main bearings, and, due to the form of bearings used, the flow of oil about the crank bearings cannot be reversed as the upper bearing acts as a valve.

Still another object of the invention is to provide a simple and novel displacement oiler for internal combustion engines that will be highly efficient in action and will positively force the oil under pressure not only to the main bearings and crank pins but also to the wrist pins and cylinder walls.

Still another object of the invention is to provide a positive oiling arrangement that is inexpensive to manufacture, positive in action, and easily assembled.

Still another object of the invention is to provide in an internal combustion engine an improved positive oiling means without employing any movable parts other than a specially arranged bearing and displacement member fitting on the lower end of a connecting rod.

With these and other objects in view, the invention consists in certain new and novel features and combination of parts, as will be hereinafter more fully explained and pointed out in the claims.

Referring now to the drawing showing a preferred embodiment:

Figure 1:
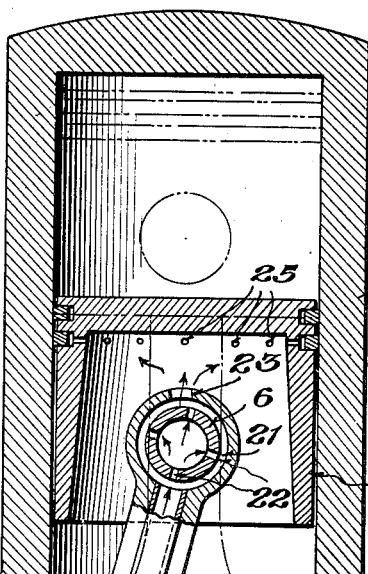
Fig. 1 is a vertical sectional view showing my improved positive oiling mechanism, parts being in full line and other parts being in section for clearness of illustration, the piston and connecting rod and its associated parts also being shown in dotted lines at the lower end of the downward stroke of the piston.
Figure 3:
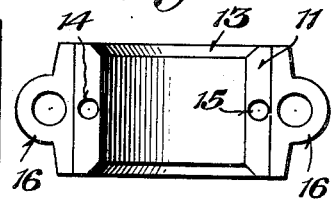
Fig. 3 is an inner face view of the upper half of the bearing or sleeve of the connecting rod.

Referring now more particularly to the several views, and for the moment to Fig. 1, there is shown the base or block 1 of an internal combustion engine with a cylinder 2 and a crank case 3 secured to the base, as at 4.

It will be understood that this internal combustion engine may be of any type and that Fig. 1 is merely illustrative of an engine block to show the manner in which the oil is to be forced under pressure not only to the crank pins, main bearings, but also up to the wrist pin and cylinder walls.

Still referring to Fig. 1, there may be seen a connecting rod 5 with its wrist pin 6. There may also be seen the crank shaft 7 and a crank pin 8, the crank being drilled throughout its length, as at 9, and the pins and parts of the crank shaft provided with radial passageways 10, which structure is common in the art.

I have not shown the main bearings or a plurality of connecting rods, as it is thought that the illustration of the one connecting rod and its several connections is sufficient for an understanding of the invention.

The connecting rod is fastened to the crank pin 8 through the medium of the two sleeves 11 and 12. These two sleeves are of novel construction and especially the lower one, as it is this sleeve with its depending portion or displacement member that forces the oil in the pocket, about to be mentioned, to the several parts to be lubricated.

Referring for the moment to the sleeve 11, it is lined, as at 13, with babbitt, while near the opposite ends of the babbitt are the two apertures 14 and 15. Bosses 16 are formed at the outer end of the sleeve, through which pass the bolts 17, which bolts also pass through the apertured bosses 18 formed at the outer end of the sleeve 12, which sleeve will be explained more in detail as the specification proceeds.

Figure 6:
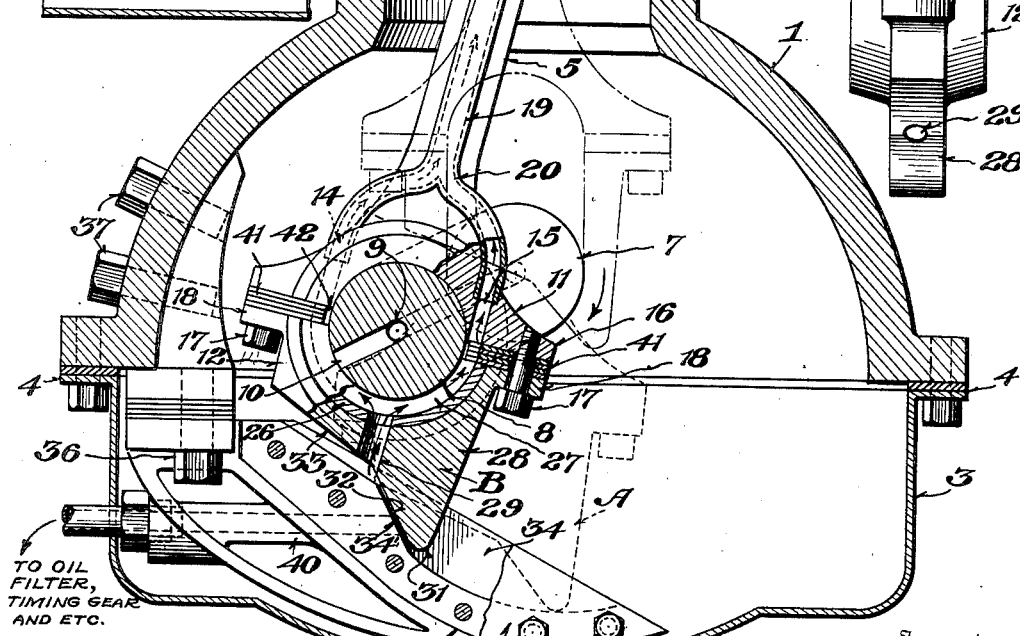
Fig. 6 is a fragmentary detail of the wrist pin bearing.
Figure 6:
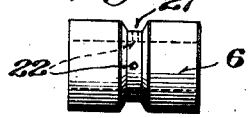

Extending from the apertures 14 and 15 is a tube 19, which is bifurcated, as at 20, the bifurcated ends fitting well within the apertures 14 and 15. This tube extends to the upper end of the connecting rod, and as the wrist pin 6, as shown in Fig. 6, is circumferentially grooved, as at 21, and provided with a plurality of radial openings 22, the oil from the tube may lubricate this bearing. Also, there will be noticed an aperture 23 in the upper end of the connecting rod, so that additional oil may be forced through this aperture internally of the piston 24, which may also be provided with the small apertures 25, so that further oil will be thrown into the cylinder wall, as may be readily seen.

Figure 4:
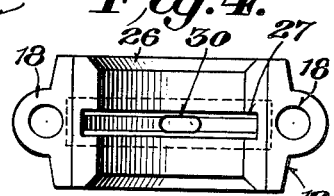
Fig. 4 is a similar view of the lower half of the bearing or sleeve, the dotted lines showing the displacement member.
Figure 5:
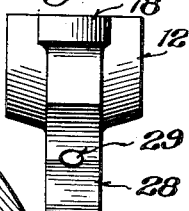
Fig. 5 is an end view of the same.

Referring now to one of the principal parts of the invention shown in Figs. 4 and 5, there is seen the sleeve 12 also lined with the usual babbitt 26 and provided with the circumferential recess or groove 27, which extends from end to end of the babbitt. Cast integrally or forming a part of this sleeve 12 is the downwardly extending displacement member 28 through which passes the upwardly extending aperture 29, which latter opens into the groove 27, as at 30. This displacement member 28 extends downwardly to a point, as at 31, and is beveled on its one face, as at 32 (see Fig. 1), and then extends upwardly at an angle, as may be plainly seen at 33.

This displacement member 28 travels through an oil pocket 34 formed in a bracket 35, which is bolted, as at 36, to the engine block and may also be bolted, as at 37, so that it will be rigid in construction.

Figure 2:
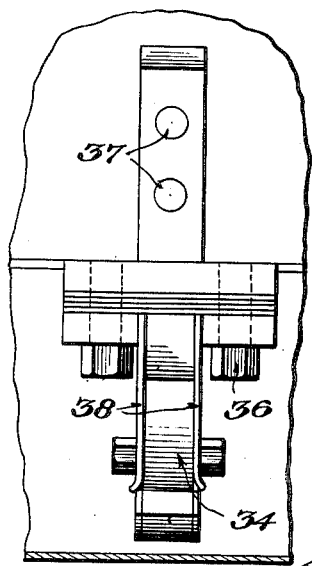
Fig. 2 is a fragmentary face view of the bracket forming an oil pocket or chamber in which the oil is momentarily placed under pressure to be driven to its several locations.

The bracket, as shown in Figs. 1 and 2, has the oil pocket 34, which is formed by the side plates 38, and the walls and bottom of the pocket may be accurately ground so that when the displacement member on the bottom of the crank rod travels from the dotted line position shown at A to the full line position shown at B, the oil will be placed under pressure within the pocket, due to the advancing of the displacement member through the pocket, and forced upwardly through the aperture 29 into the groove 27 cut in the babbitt of the sleeve 12.

It will be noticed that the upper or left-hand end 34' of the oil pocket 34 extends at the same angle as does the beveled face 32 of the displacement member, so that this wall will not interfere with the travel of the displacement member.

It will also be noticed from the dotted line position of the displacement member in Fig. 1 that the shape of the displacement member and the shape of the pocket are such that when the displacement member enters the pocket, the pocket is closed on all sides, so that as the displacement member advances, the pocket becomes smaller and smaller, thereby providing the high pressure that is desired to force the oil into the several parts heretofore mentioned.

Shown as leading from the oil chamber 34 and near its upper end is the pipe 40, which may extend to the oil filter or timing gears and thus do away with the usual pump.

In Fig. 1, there will be seen the shims 41 located between the two sleeves, and these shims are cut out, as at 42, so that the oil forced up into the groove 27 may pass these shims into the bifurcated ends 20 of the tube 19 and up into the wrist pin, as heretofore mentioned.

When the connecting rod reaches the point shown in full lines in Fig. 1, it starts to pull away from the pocket 34, as will be readily understood, and the oil (not shown) in the crank case will again have filled the pocket, so that on the next revolution of the crank shaft, the pocket will again be full of oil. When the crank rod reaches the dotted line position A, it will again have started to place the oil under pressure in the pocket to force it into the groove 27 of the sleeve.

It is also to be noticed that oil within the groove 27 will be forced into the radial opening 10 of the crank pin as long as the radial opening 10 of the crank pin is tangential to the lower sleeve. Thus, not only will oil be forced up to the wrist pin and to the cylinder walls, but it will be forced through the crank shaft to the main bearings and to the other crank pins. After the crank pin and crank shaft have revolved to a point wherein the radial opening 10 is opposite the upper sleeve 13, the oil cannot be thrown out of the radial passage as the upper sleeve acts as a valve, although it will, of course, oil the sleeve.

It will thus be appreciated that a rapid movement of the connecting rod on every revolution will force the oil through the crank shaft to the main bearings and crank pin and will also force the oil up to the wrist pin and cylinder wall. Inasmuch as there is a time interval between the pressure on the oil, the oil will flow in a pulsating movement.

If desired, the width of the displacement member 28 may be made greater and, of course, the width of the pocket 34 in the bracket would have to be made wider, but the principle would remain the same, that is, a pressure on the oil within the pocket at every revolution of the connecting rod and the parts so arranged as to force the oil to the various bearings and parts heretofore mentioned.

It will be understood that more than one of these oiling mechanisms may be placed in the engine. For instance, one could be placed at each end of the engine, so that the oil would be driven from both ends to the various connecting rods and bearings.

Also, if used in a Diesel engine, an individual oiling arrangement, as shown, could be used for each connecting rod, which would not only tend to keep the bearings well lubricated but also tend to cool the cylinders.

It will further be understood that the oiler will work in V engines, marine, and radial engines with but little change in arrangement.

I am aware that it is not new in the art to provide tubes for leading oil up to the wrist pins and I am also aware that the splash system is utilized for lubricating the several parts, but my invention contemplates a thorough oiling of the several parts by forming not a pick-up or splash or utilizing various gears to perform this function but to provide an oil pocket and a displacement member at the end of the connecting rod, so that there is a forced feed lubrication or positive displacement of the oil on each rotation of the crank shaft.

It will be understood that the drawings are only illustrative of the invention and many changes might be made in the several parts without in any manner departing from the spirit and scope of the invention.

Having thus described my invention, what I claim as new and desire to secure by Letters Patent is:

1. In combination, a connecting rod having at its lower end a two-part crank pin bearing, a displacement member carried by the lower part and provided with an oil passage, the inner face of the bearing provided with a groove and said passage leading to said groove, the upper part of the crank pin bearing provided with two apertures registering with said groove, a tube connected to said apertures and leading to the upper end of said connecting rod, a bracket located beneath the connecting rod and having an oil chamber into which said displacement member advances during a part of its movement to thereby place the oil under pressure and force oil from said chamber into said oil passage, through said tube to the upper end of said connecting rod.

2. In combination, a connecting rod having at its lower end a two-part crank pin bearing, a displacment member carried by the lower part of said bearing and provided with a vertically extending oil passage, the inner face of said bearing provided with a circumferential groove and said oil passage registering with said groove, the upper part of the crank pin bearing provided with two oppositely located apertures and registering with the groove provided in the lower part of the bearing, a tube connected with said apertures and leading to the wrist pin of said connecting rod, a bracket located beneath the connecting rod and having an oil pocket into which said displacement member advances during a part of its elliptical movement to thereby place the oil under pressure in said chamber and force it into said oil passage, groove, and up said tube to the wrist pin of said connecting rod.

3. In combination, a crank shaft and connecting rod, a bearing or sleeve at the lower end of said connecting rod, said sleeve provided with a downwardly extending displacement member, said sleeve having an internally located circumferential groove and said displacement member provided with an oil passage leading to said groove, a member provided with an oil pocket located within the path of travel of the displacement member to entrap the oil whereby on a movement of the connecting rod the displacement member will force the oil trapped in said pocket through said oil passage to the crank pin of the connecting rod.

4. The combination of a crank shaft and connecting rod, a displacement member secured to the lower end of the connecting rod, an oil chamber within the path of the displacement member, said oil chamber having an outlet extending to parts to be lubricated, and the displacement member adapted to entrap and force the oil from said chamber on every revolution of the crank shaft through said outlet to the parts to be lubricated.

5. The combination of a crank shaft and connecting rod, a displacement member secured to the lower end of the connecting rod, an oil chamber within the path of the displacement member, said oil chamber having an outlet extending to parts to be lubricated other than the crank shaft, the displacement member adapted to entrap and force the oil under pressure from said chamber on every revolution of the crank shaft, and said displacement member also having an oil passage therethrough whereby the oil may also be forced to the crank pins of the connecting rod.

6. In an internal combustion engine, the combination of a drilled crank shaft and a connecting rod, a wrist pin, an oil pocket secured in the base of the engine, a displacement member secured to the lower end of the connecting rod and adapted to pass through said oil pocket, said displacement member and the connecting rod having an oil passage leading to said wrist pin, and the displacement member subjecting the oil to pressure within the pocket on every revolution and forcing the oil through said displacement member through said drilled crank shaft and up to said wrist pin.

7. In an internal combustion engine, the combination of a connecting rod and crank shaft, sleeves at the lower end of the crank shaft for encircling the crank pin of the connecting rod, the upper sleeve having two apertures extending therethrough and an oil tube registering with these apertures and leading to the wrist pin, the lower sleeve of the connecting rod having a displacement member thereon and having a circumferential groove therein registering with the apertures in the upper sleeve, the displacement member having an oil passageway extending to said groove, an oil chamber fitted in the crank case and within the path of movement to be occupied by the displacement member of the said sleeve whereby on every revolution of the crank shaft oil under pressure will be forced from said chamber through said displacement member about the crank pin and up into said oil tube to the wrist pin.

8. A positive displacement oiler including in part a lower sleeve for a connecting rod, said sleeve having a displacement member extending downwardly therefrom, an oil chamber to receive said displacement member, said displacement member and said oil chamber acting as a pump, and the oil in said chamber being placed under pressure on every revolution of the displacement member, and said chamber having an auxiliary passageway leading to parts, other than the crank shaft, to also be lubricated on every revolution of the displacement member.

9. An oiling mechanism for internal combustion engines including in part a sleeve to be secured to the lower end of a connecting rod, said sleeve provided with a circumferential groove and a downwardly extending displacement member provided with an oil passageway extending to said groove; an oil chamber adapted to receive said displacement member, and the oil chamber and displacement member forming a pump and so arranged that as the displacement member moves through the oil chamber the oil will be placed under pressure in said chamber and forced therefrom.

10. In an oiling system for internal combustion engines, an oil chamber in the crank case for entrapping the oil, a connecting rod, means on the connecting rod for passing through said chamber and placing the oil under pressure in said chamber, said means provided with an oil passageway to the crank pins, and further passageways leading from around the crank pins to the wrist pin whereby oil will also be forced to said wrist pin.

11. In an internal combustion engine, the combination of a crank shaft having an oil passageway extending therethrough and radial oil passages extending therefrom, a connecting rod, sleeves at the lower end of the connecting rod the lower of which is provided with an internal circumferential groove, a displacement member extending from the bottom of the said sleeve and having a passageway extending to said groove, an oil pocket in the crank case for entrapping the oil, the displacement member adapted to pass through said oil pocket and force the oil under pressure from said pocket through the displacement member into said groove and into a radial passageway of the crank pin to thereby force oil through said crank shaft and out of the other radial passageway.

12. A positive displacement oiler for the crank shaft and crank pins of an internal combustion engine including a connecting rod, a downwardly projecting displacement member at the lower end of said connecting rod, means provided with an oil trap located beneath the connecting rod and in the path of travel of the displacement member, the said trap being just slightly wider than the width of the displacement member to provide a sliding fit, the displacement member provided wth a passage extending therethrough, and the displacement member adapted to advance through said oil pocket whereby on a movement of said connecting rod when near its lowest position the displacement member will force the oil under pressure through said displacement member to the crank shaft and crank pins of the engine.

13. The combination of a crank shaft, a connecting rod and an oil displacement member secured to the connecting rod, means secured beneath the connecting rod having an oil trap therein of such size to slidably accommodate the displacement member, the said oil displacement member adapted to pass through said oil trap and force the oil under pressure therefrom on every revolution of the connecting rod to said crank shaft.

14. In combination with an internal combustion engine, an additional oil pocket within the crank case, displacement means forming a part of the connecting rod for placing the oil in said pocket under pressure, said pocket also having an outlet extending to parts to be lubricated other than the crank shaft whereby the oil will be forced by said displacement means through said outlet on every revolution of the crank shaft, and passageways also leading through said displacement means around the bearings of said connecting rod and to the upper end of the crank shaft whereby oil under pressure will also be forced to said parts during every revolution of the connecting rod.

15. An oiling arrangement for lubricating the wrist pins and cylinder walls of internal combustion engines including an oil chamber fitted within the crank case, a connecting rod, a displacement member, said displacement member and said oil chamber forming a pump, an oil conduit leading through the displacement member to the wrist pins and upper end of the connecting rod, the displacement member adapted to pass through the oil chamber on every revolution of the crank shaft to thus force the oil from said chamber to said wrist pins and out through the upper end of said connecting rod to thereby oil the said cylinder.

JACK SHARON WESTFIELD.